United States Patent [19]
Miller

[11] Patent Number: 5,303,499
[45] Date of Patent: Apr. 19, 1994

[54] FISHING DEVICE

[76] Inventor: Matthew A. Miller, 505 Fairway Ct., Broken Arrow, Okla. 74011

[21] Appl. No.: 17,421

[22] Filed: Feb. 8, 1993

[51] Int. Cl.$^5$ ............................................. A01K 91/00
[52] U.S. Cl. .................................. 43/43.15; 43/43.14
[58] Field of Search ................... 43/43.1, 43.14, 43.15, 43/44.9

[56] References Cited

U.S. PATENT DOCUMENTS

| | | | |
|---|---|---|---|
| 691,407 | 1/1902 | Pacetty | 43/43.15 |
| 2,001,241 | 5/1935 | DeVries | 43/43.15 |
| 2,440,989 | 5/1948 | Van Brunt | 43/43.15 |
| 2,498,815 | 2/1950 | McVay | 43/43.15 |
| 3,608,229 | 9/1971 | Ross | 43/43.15 |
| 3,670,447 | 6/1972 | Wohead | 43/43.14 |
| 3,820,270 | 6/1974 | La Force | 43/43.14 |
| 3,897,649 | 8/1975 | Jorgensen | 43/43.15 |
| 3,974,591 | 8/1976 | Ray | 43/43.14 |
| 4,649,662 | 3/1987 | Tharp | 43/43.14 |

FOREIGN PATENT DOCUMENTS

| | | | |
|---|---|---|---|
| 622468 | 9/1962 | Belgium | 43/43.15 |
| 3513590 | 10/1986 | Fed. Rep. of Germany | 43/43.14 |

*Primary Examiner*—Kurt C. Rowan
*Attorney, Agent, or Firm*—Hugh E. Smith

[57] ABSTRACT

A counter-balanced sinker device for drift fishing or trolling comprising a tubular weight detachably affixed at one end to a flotation unit capable of holding said one end substantially vertically above the other end of such weight but incapable of lifting the entire weight, with means on the flotation unit to allow a fishing line to run freely therethrough. The device may be equipped with a weed or rocks deflector and with means to produce a fish-attracting noise when in use.

15 Claims, 3 Drawing Sheets

FISHING DEVICE

BACKGROUND OF THE INVENTION

1. Field of the Invention

The present invention relates to a fishing device and more particularly pertains to such device which may be used to troll or drift fish a lure at a predetermined depth without snagging or hanging up on the bottom.

2. Description of the Prior Art

The use of fishing line sinkers is well is known in the prior art. More specifically, devices heretofore devised and utilized for the purpose of sinking a fishing lure are known to consist basically of familiar, expected and obvious structural configurations, notwithstanding the myriad of designs encompassed by the crowded prior art which have been developed for the fulfillment of countless objectives and requirements.

In this respect, the device according to the present invention substantially departs from the conventional concepts and designs of the prior art, and in so doing provides an apparatus primarily developed for the purpose of trolling or drift fishing a lure at depth without snagging on the bottom.

Some of the various configurations of prior art sinker devices are illustrated in U.S. Pat. Nos. 4,691,468; 4,450,646; 3,955,305; 3,461,597; and Des. 282,956.

Therefore, it can be appreciated that there exists a continuing need for new and improved sinker devices which can be snag-free. In this regard, the present invention substantially fulfills this need.

SUMMARY OF THE INVENTION

In view of the foregoing disadvantages inherent in the known types of sinkers now present in the prior art, the present invention provides an improved fishing device. As such, the general purpose of the present invention, which will be described subsequently in greater detail, is to provide a new and improved sinker device which has all the advantages of the prior art and none of the disadvantages.

To attain this, the present invention utilizes a weight device adapted to hold a fishing line near the bottom but to allow such line to freely slip through such device. By using a floating lure the line aft of the weight device may rise to any desired depth. This is achieved by providing an impediment on the line restricting it from sliding back through the sinker. This needs to be slidable on the line when strong pull is placed on the line as by a strike or fish retrieval or to disappear under such circumstances as by using a slip knot as the impediment. Other alternatives are a split shot or bobber tie knot, both of which are conventionally known in the fishing art. The amount of line extending through the device is adjusted to allow the lure to float to the desired depth. The impediment then prevents the line from returning through the device until the aforesaid strong pull happens. The device of the present invention rides freely on the line holding it above the bottom while the construction as explained in connection with the drawings essentially eliminates snagging on the bottom.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing device which has all the advantages of the prior art devices and none of the disadvantages.

It is another object of the present invention to provide a new and improved fishing device which may be easily and efficiently manufactured and marketed.

It is a further object of the present invention to provide a new and improved fishing device which is of a durable and reliable construction.

An even further object of the present invention is to provide a new and improved fishing device which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved sinker fishing device which provides in the apparatuses and methods of the prior art some of the advantages thereof, while simultaneously overcoming some of the disadvantages normally associated therewith.

Still another object of the present invention is to provide a new and improved counter-balanced sinker fishing device.

Yet another object of the present invention is to provide a new and improved device especially suited to drift fishing or trolling.

Even still another object of the present invention is to provide a new and improved non-snagging sinker device for fishing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
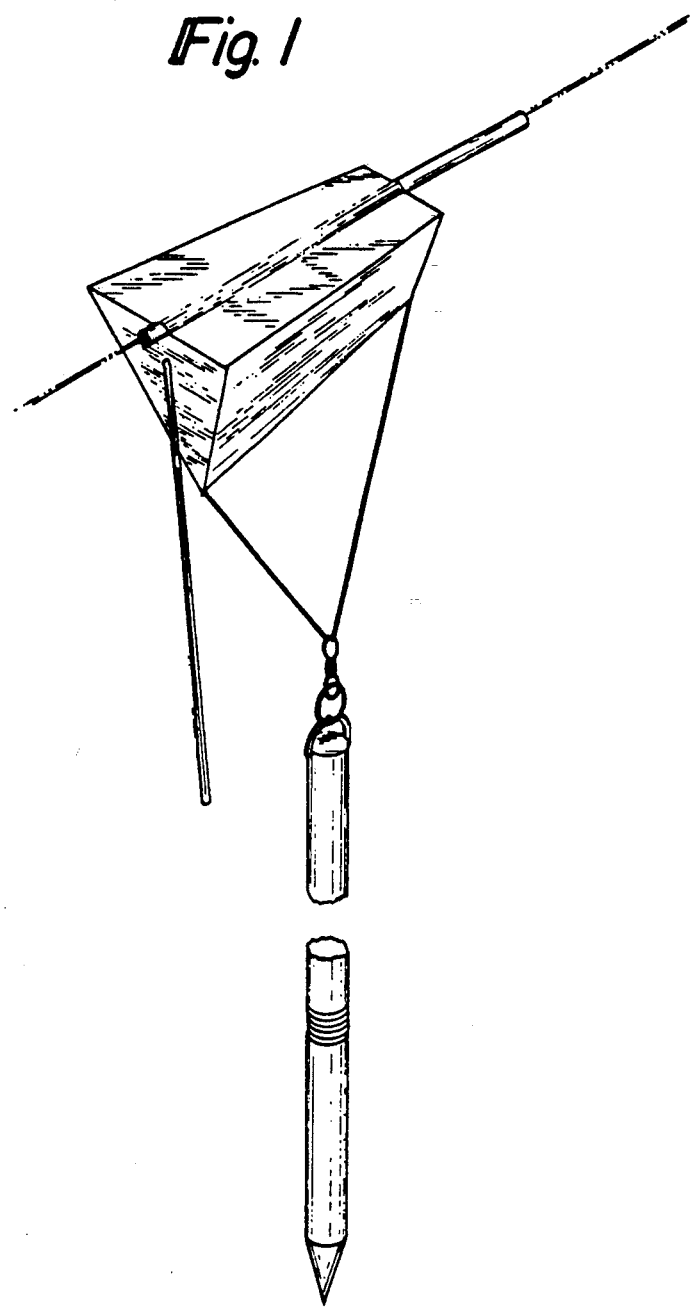
FIG. 1 is a perspective view of the present invention in use.

With reference now to the drawings, and in particular to FIG. 1 thereof, a new and improved fishing device embodying the principles and concepts of the present invention will be described.

More specifically, it will be noted that FIG. 1 is a perspective view of the device of the present invention showing its relation to a fishing line 10 in use. The device consists of a tubular weight member 11 preferably having a pointed closed end 12, the weight member 11 being attached at the other end 13 to a floatation member 14. The floatation member 14 is provided with guide means to allow the line 10 to be freely slidable therethrough. As shown in this Figure, such means preferably comprises an open tube member 15 of larger diameter than line 10. The connection 16 between the weight member 11 and the floatation member 14 is frangible or detachable so that should the weight member 11 be caught in rocks or the like, it will separate from the floatation member 14. Also shown in this FIG. 1 is a deflector rod 17 which serves to ease passage through weed growth or to ride up over large rocks if any are encountered during movement of the device through the water.

Figure 2:
FIG. 2 is a top plan view of the device in FIG. 1.

FIG. 2 is a top view of the device showing the line guide means 15 extending through floatation member 14.

Figure 3:
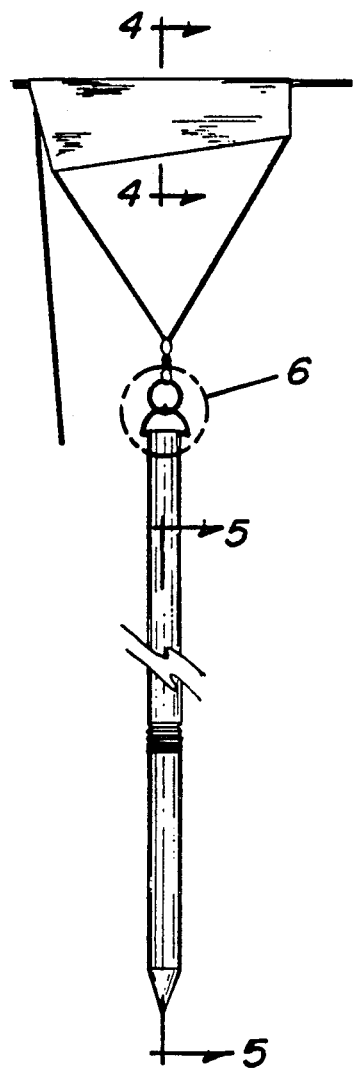
FIG. 3 is a side plan view of the device of the present invention.

FIG. 3 is a side elevation of the device of the present invention illustrating that preferably the floatation member 14 has the forward end 18 thereof larger than the aft end 19. This will give slightly increased lift to the forward end 18 tending to keep the depending weight member 11 more nearly vertical in use. Rigid connecting members 20 are provided, extending downwardly from floatation member 14 to provide connection 16 (as shown more clearly in FIG. 6) between floatation member 14 and weight member 11. Again, as in FIG. 1, the deflector rod 17 and line guide 15 are shown attached to floatation member 14. Tubular weight member 11 is shown with a bendable or deformable joint 21 intermediate the pointed end 12 and upper end 13 thereof. This permits deliberate angling of the weight member 11 if desired and will also act to minimize any hang-up of such weight member by letting it bend under stress.

Figure 4:
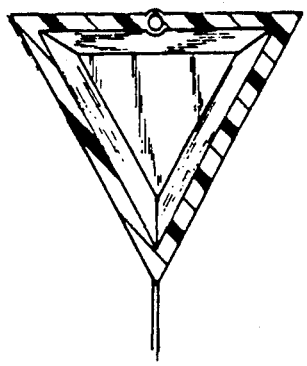
FIG. 4 is a sectional view taken on line 4—4 of FIG. 3.

FIG. 4 is a sectional view taken on line 4—4 of FIG. 3 showing the line guide 15 extending through floatation member 14 and again illustrating that the forward end 18 of floatation member 14 is larger than the trailing or aft end 19 thereof. Numeral 20 indicates the rigid connecting member leading to weight member 11.

Figure 5:
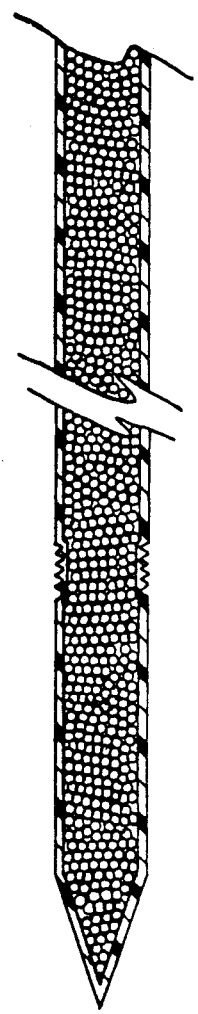
FIG. 5 is a cross-sectional view taken on line 5—5 of FIG. 3.

FIG. 5 is a sectional view taken on line 5—5 of FIG. 3. In this embodiment, tubular weight member 11 is shown as a hollow tube 22 having therein a plurality of small-diameter spherical weights 23. These could be substituted with any shape which would fit within tube 22, or the tube could even be solid if desired. However making the weight member with a plurality of small weight units is preferred since it permits easier bending of such tubular weight member at joint 21 as is mentioned above. It is preferred that the spherical or other shape weights be made of steel, iron or other biodegradable material in case of rupture of the tube or breaking away thereof as discussed in connection with FIG. 6.

Figure 6:
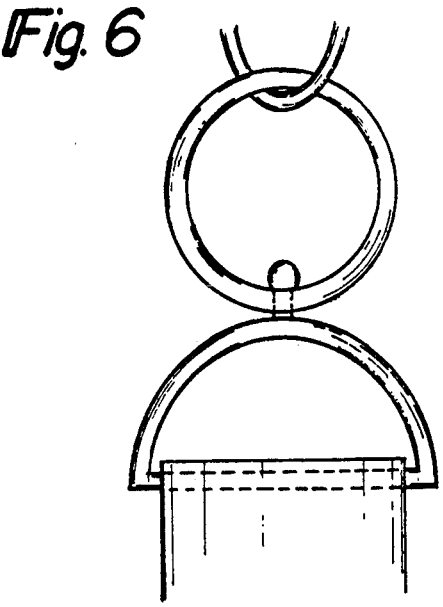
FIG. 6 is an enlarged view of the area indicated by the circle 6 on FIG. 3.

Referring now to FIG. 6, an enlarged plan view of the circled area 6 in FIG. 3, it will be seen that weight member 11 is connected to the depending rods 2 from floatation unit 14 by means of a swivel ring 24 which permits weight member 11 to move freely in all directions. Member 11 is attached to swivel ring 24 in such a manner that heavy stress exerted by member 11 will cause it to separate from the swivel ring 14. As shown, this attachment is by a frangible member 25, e.g. plastic pin. Variations such as using a split ring as the swivel ring also may be used.

It will be seen from the foregoing description that what is provided herein is a weighted device which will carry a fishing line down to the bottom of the body of water being fished and while drift fishing or trolling will support such line free of the bottom or at any desired elevation above the bottom when a floating lure is used, such device having a small weighted end which will ride across the bottom and it and the rest of such weights being of such shape and configuration as to minimize the possibility of snagging. Means are provided to permit the weighted portion of the device to bend to help escape any snag and, in the case one should occur, to separate from the rest of the device, allowing the line to float up.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. One optional modification in particular is to provide means for the device to produce a fish-attracting noise. The use of the spherical balls within the tubular weight can be a noise maker, and further the provision of several shot or spherical balls within the floatation member can augment such noise generation.

What is claimed as being new and desired to be protected by Letters Patent of the United States is as follows:

1. A new fishing device for use with a fishing line, said device comprising:
   a buoyant floatation member having both a forward end and an aft end;
   a line guide means coupled to said floatation member for slidably coupling said fishing line thereto;
   a connecting member coupled to both said forward end and said aft end of said floatation member and extending therebetween to form a V-shape;
   a non-buoyant weight member having an upper end and a pointed end at respectively opposed ends thereof, and further having a deformable joint located between said upper end and said pointed end which allows said weight member to bend;
   a connection means coupled to said connecting member proximate an apex of said V-shaped connecting member and further coupled to said upper end of said weight member and;
   a deflector rod coupled to said forward end of said floatation member and extending downwardly therefrom, said deflector rod being operable to preclude said fishing device from becoming entangled in underwater obstacles.

2. The new fishing device of claim 1, wherein said floatation member has a substantially elongated, tapered triangular shape in which a volume of said forward end is greater than a volume of said aft end so as to cause said forward end to buoyantly rise above said aft end when immersed in water.

3. The new fishing device of claim 2, wherein said line guide means comprised an open tube member passing through an aperture in said floatation member, said open tube member being operable to allow said fishing line to slidably pass therethrough.

4. The new fishing device of claim 1, wherein said connection means comprises a swivel ring through which said connecting member passes, and a frangible member coupled to both said weight member and said swivel ring, said frangible member being operable to release said weight member upon an application of a predetermined force to said frangible member.

5. The new fishing device of claim 4, wherein said frangible member comprises a plastic pin.

6. The new fishing device of claim 4, wherein said frangible member comprises a split ring.

7. The new fishing device of claim 1, wherein said weight member comprises a solid tube.

8. The new fishing device of claim 1, wherein said weight member comprises a hollow tube having a plurality of weights contained therein.

9. The new fishing device of claim 8, wherein said plurality of weights comprises spherical weights.

10. A new fishing device for use with a fishing line, said device comprising:
    a buoyant floatation member defining a substantially elongated, tapered triangular shape having a hollow interior and further having both a forward end and an aft end in which a volume of said forward end is greater than a volume of said aft end so as to cause said forward end to buoyantly rise above said aft end when immersed in water;
    a line guide coupled to said floatation member for slidably coupling a fishing line to said floatation member, said line guide comprising a substantially straight open tube member passing through an aperture in said floatation member;
    a rigid connecting member connected to both said forward end and said aft end of said floatation member and extending therebetween to form a V-shape;
    a non-buoyant weight member having both an upper end and a pointed end at respectively opposed ends thereof, and comprising a deformable joint located between said upper end and said pointed end which allows said weight member to bend;
    a connection means coupled to said connecting member proximate an apex of said V-shaped connecting member, said connection means comprising a swivel ring through which said connecting member passes, and a frangible member coupled to both said weight member and said swivel ring, said frangible member being operable to release said weight member upon an application of a predetermined force to said frangible member and;
    a deflector rod coupled to said forward end of said floatation member and extending downwardly therefrom, said deflector rod being operable to preclude said fishing device from becoming entangled in underwater obstacles.

11. The new fishing device of claim 10, wherein said frangible member comprises a plastic pin.

12. The new fishing device of claim 10, wherein said frangible member comprises a split ring.

13. The new fishing device of claim 11, wherein said weight member comprises a solid tube.

14. The new fishing device of claim 11, wherein said weight member comprises a substantially hollow tube having a plurality of weights contained therein.

15. The new fishing device of claim 14, wherein said plurality of weights are spherical weights, said spherical weights being loosely contained within said hollow tubular member and operable to create noises upon a movement of said hollow tubular member.

* * * * *